United States Patent
Takahashi et al.

(10) Patent No.: US 8,134,667 B1
(45) Date of Patent: Mar. 13, 2012

(54) LIQUID CRYSTAL DISPLAY DEVICE

(75) Inventors: Risa Takahashi, Mobara (JP);
Katsuhiko Ishi, Chosei (JP)

(73) Assignees: HItachi Displays, Ltd., Chiba (JP);
Panasonic Liquid Crystal Display Co., Ltd., Hyogo-ken (JP)

( * ) Notice: Subject to any disclaimer, the term of this patent is extended or adjusted under 35 U.S.C. 154(b) by 0 days.

(21) Appl. No.: 13/230,091

(22) Filed: Sep. 12, 2011

Related U.S. Application Data (62) Division of application No. 12/356,853, filed on Jan. 21, 2009, now Pat. No. 8,045,108.

(30) Foreign Application Priority Data

Jan. 21, 2008 (JP) .................................. 2008-010047

(51) Int. Cl.
*G02F 1/1333* (2006.01)
(52) U.S. Cl. ........................................................ 349/122
(58) Field of Classification Search ................ 349/12, 349/112, 122
See application file for complete search history.

(56) References Cited

U.S. PATENT DOCUMENTS

| | | | | |
|---|---|---|---|---|
| 4,715,686 | A | * | 12/1987 | Iwashita et al. ............... 349/137 |
| 5,106,197 | A | * | 4/1992 | Ohuchida et al. ............... 349/73 |
| 7,430,030 | B2 | | 9/2008 | Sikharulidze |
| 2004/0263481 | A1 | | 12/2004 | Nishikawa et al. |

FOREIGN PATENT DOCUMENTS

| | | |
|---|---|---|
| CN | 1549962 | 11/2004 |
| JP | 04-326419 | 11/1992 |
| JP | 2001-042301 | 2/2001 |
| JP | 2006-221187 | 8/2006 |
| JP | 2007-127129 | 5/2007 |
| JP | 2007-178758 | 7/2007 |

* cited by examiner

*Primary Examiner* — Richard Kim
(74) *Attorney, Agent, or Firm* — Antonelli, Terry, Stout & Kraus, LLP.

(57) ABSTRACT

A liquid crystal display device includes a liquid crystal display panel having a first substrate, a second substrate disposed on an observer side of the first substrate, and a liquid crystal layer sandwiched between the first substrate and the second substrate, and a transparent cover affixed by a first bonding member to a surface of the liquid crystal display panel on the observer side. The transparent cover has an optical member affixed by a second bonding member to a surface of the transparent cover facing the second substrate, and when viewed in plan, an edge of the transparent cover and an edge of the optical member protrude outside the second substrate.

10 Claims, 6 Drawing Sheets

LIQUID CRYSTAL DISPLAY DEVICE

CROSS REFERENCE TO RELATED APPLICATION

This application is a divisional application of U.S. application Ser. No. 12/356,853, filed Jan. 21, 2009 now U.S. Pat. No. 8,045,108, the contents of which are incorporated herein by reference.

CLAIM FOR PRIORITY

The present application claims priority from Japanese application JP2008-10047 filed on Jan. 21, 2008, the content of which is hereby incorporated by reference into this application.

BACKGROUND OF THE INVENTION

1. Technical Field

The present invention relates to a liquid crystal display device, and in particular relates to a liquid crystal display device to a surface of a liquid crystal display panel of which a transparent cover is affixed by means of an adhesive.

2. Related Art

For example, as a liquid crystal display device for a portable telephone, one is known in which a protective cover (a transparent cover) made of, for example, an acryl resin, or the like, is disposed on a surface of its liquid crystal display panel, and they are affixed together with an adhesive.

A liquid crystal display device is also known which, in the event that an air layer exists between a protective cover and a liquid crystal display panel, as an unnecessary interface reflection occurs in an interface with the air layer, causing a reduction in a display contrast, is configured having the protective cover affixed to the liquid crystal display panel by means of the adhesive (which has a refractive index close to that of the transparent cover) in advance.

Herein, the liquid crystal display panel is configured having a pair of substrates made of, for example, glass bonded together via a seal material, and a liquid crystal layer sandwiched between the pair of substrates. Then, a polarizing plate is disposed, by means of an adhesive, on a surface of each substrate opposite to the liquid crystal layer.

For this reason, the protective cover is configured affixed to a top surface of the polarizing plate disposed on an observer side of the liquid crystal display panel.

A liquid crystal display device of this kind of configuration is disclosed in JP-A-2007-178758. Also, as patent documents relating to the invention, apart from JP-A-2007-178758, there are JP-A-2001-42301, JP-A-4-326419, JP-A-2006-221187 and JP-A-2007-128129.

SUMMARY OF THE INVENTION

However, it has been found that, with the liquid crystal display device configured having the protective cover affixed to the top surface of the polarizing plate, it may happen that a place in which a bright spot defect occurs comes out in a display of the liquid crystal display device. Then, it has turned out that it is caused by a chemical polishing flaw, called a dimple, formed in a surface of an observer side substrate of the liquid crystal display panel.

This kind of polishing flaw, when chemically polishing at least the observer side substrate of the liquid crystal display panel, and forming it with a small thickness, being a flaw formed in a polished surface thereof, the bright spot defect occurs due to an interface reflection in an interface with an air layer existing in the flaw. As heretofore described, the polarizing plate is disposed, by means of the adhesive, on the polished surface of the substrate but, as an adhesive between the substrate and the polarizing plate normally has a small thickness of 10 to 25 μm, the adhesive cannot completely fill the polishing flaw, and a condition is such that an air pocket still accumulates in the polishing flaw.

This leads to it being demanded that the bright spot defect caused by the polishing flaw be avoided with a simple configuration, thereby achieving an improvement in a display quality.

Also, it has been found that, with the liquid crystal display device configured having the protective cover attached, it may happen that, other than the heretofore described dimple problem, a circular display irregularity called a so-called yellow border occurs in which a display area of the liquid crystal display device turns yellow around a perimeter thereof.

It has turned out that this is due to the fact that, in the polarizing plate disposed on the observer side substrate of the liquid crystal display panel to which is attached the protective cover, an edge likely to absorb moisture expands, and the liquid crystal display panel is deformed due to the expansion.

That is, the protective cover being configured of a relatively thick material, the liquid crystal display panel affixed thereto experiences a force in a direction opposite to the protective cover, on a perimeter of the liquid crystal display panel, due to the expansion of the edge of the polarizing plate, and is deformed in such a way as to have a convexity on a protective cover side.

In the liquid crystal display panel, a portion in which a gap between the pair of substrates widens appears in the display area of the liquid crystal display panel due to this kind of deformation, and the yellow border occurs in the portion.

This leads to it being demanded that the yellow border be avoided with the simple configuration, thereby achieving the improvement in the display quality.

An object of the invention is to provide a liquid crystal display device in which it is possible, with a simple configuration, to avoid a bright spot defect caused by a chemical polishing flaw, called a dimple, which is formed in a surface of an observer side substrate of a liquid crystal display panel.

Another object of the invention is to provide a liquid crystal display device in which it is possible, with a simple configuration, to avoid an occurrence of a so-called yellow border.

In the previously mentioned JP-A-2001-42301, although there is no disclosure of a problem caused by the yellow border, a liquid crystal display device is disclosed in which, in the event that there is a flaw in a substrate of a liquid crystal display panel, the flaw is filled with a transparent resin layer, and a polarizing plate is attached to a top thereof by means of an adhesive layer. However, there is no description as to whether or not the flaw is caused by a chemical polishing, and a configuration is adopted such that no protective cover is provided.

Also, in the previously mentioned JP-A-4-326419, although there is no disclosure of a problem caused by the dimple or the yellow border, a disclosure is included in which a touch panel (corresponding to the heretofore described protective cover) is disposed on an observer side surface of a liquid crystal display panel, but a configuration such that the touch panel is affixed to the liquid crystal display panel is not adopted.

Also, in the previously mentioned JP-A-2006-221187, a liquid crystal display device is disclosed in which a transparent touch switch is affixed to a top of a polarizing plate, in the same way as in JP-A-2007-178758. However, the problem of the dimple is not disclosed.

Furthermore, in the previously mentioned JP-A-2007-128129, a configuration is disclosed such that a touch panel is affixed to a liquid crystal display panel by means of an adhesive 50, and a polarizing plate 6a is disposed on a top surface of the touch panel. Also, a configuration is disclosed such that an upper substrate 8a of the touch panel and a lower substrate 22b of the liquid crystal display panel are made partially thin by means of a chemical polishing, and the polarizing plate is disposed in this portion. However, there is no description of an upper substrate 22a of the liquid crystal display panel being chemically polished, and no polarizing plate is affixed to a backside of the touch panel, either.

To briefly describe a summary of a typical invention, among inventions disclosed in the present application, it is as follows.

1. A liquid crystal display device according to the invention includes, for example, a liquid crystal display panel having a first substrate, a second substrate disposed on an observer side of the first substrate, and a liquid crystal layer sandwiched between the first substrate and the second substrate, and a transparent cover affixed by means of a first bonding member to a surface of the liquid crystal display panel on the observer side, wherein the transparent cover has an optical member affixed by means of a second bonding member to a surface of the transparent cover facing the second substrate, the second substrate has a chemically polished surface on the observer side, the first bonding member, as well as making direct contact with both the polished surface of the second substrate and the optical member, covers all of a surface portion of the second substrate corresponding to a display area, and the first bonding member is 30 to 200 μm in thickness, while the second bonding member is 10 to 25 μm in thickness.

2. In the liquid crystal display device according to the invention, for example, on the premise of the configuration 1, the first bonding member is 30 to 100 μm in thickness.

3. In the liquid crystal display device according to the invention, for example, on the premise of the configuration 1 or 2, the first bonding member is an adhesive into which a liquid is cured.

4. In the liquid crystal display device according to the invention, for example, on the premise of the configuration 1 or 2, the first bonding member is an adhesive.

5. In the liquid crystal display device according to the invention, for example, on the premise of any one of the configurations 1 to 4, the second bonding member is an adhesive.

6. In the liquid crystal display device according to the invention, for example, on the premise of any one of the configurations 1 to 5, the optical member includes at least one of a polarizing plate or a retardation plate.

7. In the liquid crystal display device according to the invention, for example, on the premise of any one of the configurations 1 to 6, when viewed in plan, an edge of the transparent cover and an edge of the optical member protrude outside the second substrate.

8. In the liquid crystal display device according to the invention, for example, on the premise of any one of the configurations 1 to 6, it further includes:

a seal material bonding the first substrate and the second substrate together, wherein when viewed in plan, an edge of the optical member is positioned on a display area side of the seal material, and the first bonding member covers all of a side surface of the optical member.

9. In the liquid crystal display device according to the invention, for example, on the premise of any one of the configurations 1 to 6, it further includes:

a seal material bonding the first substrate and the second substrate together, wherein when viewed in plan, an edge of the optical member is superimposed on the seal material.

10. In the liquid crystal display device according to the invention, for example, on the premise of any one of the configurations 1 to 9, the transparent cover is a protective cover configured of a glass plate or a resin plate.

11. In the liquid crystal display device according to the invention, for example, on the premise of any one of the configurations 1 to 9, the transparent cover has a function of a touch panel.

12. A liquid crystal display device according to the invention includes, for example, a liquid crystal display panel having a first substrate, a second substrate disposed on an observer side of the first substrate, and a liquid crystal layer sandwiched between the first substrate and the second substrate, and a transparent cover affixed by means of a first bonding member to a surface of the liquid crystal display panel on the observer side, wherein the transparent cover has an optical member affixed by means of a second bonding member to a surface of the transparent cover facing the second substrate, and when viewed in plan, an edge of the transparent cover and an edge of the optical member protrude outside the second substrate.

13. In the liquid crystal display device according to the invention, for example, on the premise of the configuration 12, the second substrate has a chemically polished surface on the observer side, the first bonding member, as well as making direct contact with both the polished surface of the second substrate and the optical member, covers all of a surface portion of the second substrate corresponding to a display area, and the first bonding member is 30 to 200 μm in thickness, while the second bonding member is 10 to 25 μm in thickness.

14. In the liquid crystal display device according to the invention, for example, on the premise of the configuration 12, the first bonding member is 30 to 200 μm in thickness.

15. In the liquid crystal display device according to the invention, for example, on the premise of any one of the configurations 12 to 14, the first bonding member is 30 to 100 μm in thickness.

16. In the liquid crystal display device according to the invention, for example, on the premise of any one of the configurations 12 to 15, the first bonding member is an adhesive into which a liquid is cured.

17. In the liquid crystal display device according to the invention, for example, on the premise of any one of the configurations 12 to 15, the first bonding member is an adhesive.

18. In the liquid crystal display device according to the invention, for example, on the premise of any one of the configurations 12 to 17, the second bonding member is an adhesive having a thickness of 10 to 25 μm.

19. In the liquid crystal display device according to the invention, for example, on the premise of any one of the configurations 12 to 18, the optical member includes at least one of a polarizing plate or a retardation plate.

20. In the liquid crystal display device according to the invention, for example, on the premise of any one of the configurations 12 to 19, the transparent cover is a protective cover configured of a glass plate or a resin plate.

21. In the liquid crystal display device according to the invention, for example, on the premise of any one of the configurations 12 to 19, the transparent cover has a function of a touch panel.

The invention, not being limited to the above configurations, can be variously modified without departing from the scope of the technical idea of the invention.

With the liquid crystal display device configured in this way, it is possible, with the simple configuration, to avoid the bright spot defect caused by the chemical polishing flaw, called the dimple, which is formed in the surface of the observer side substrate of the liquid crystal display panel. Also, with the liquid crystal display device configured in this way, it is possible, with the simple configuration, to avoid the occurrence of the so-called yellow border.

DESCRIPTION OF THE PREFERRED EMBODIMENTS

Hereafter, a description will be given, using the drawings, of embodiments of a liquid crystal display device according to the invention.

Embodiment 1

Overall Configuration

Figure 2:
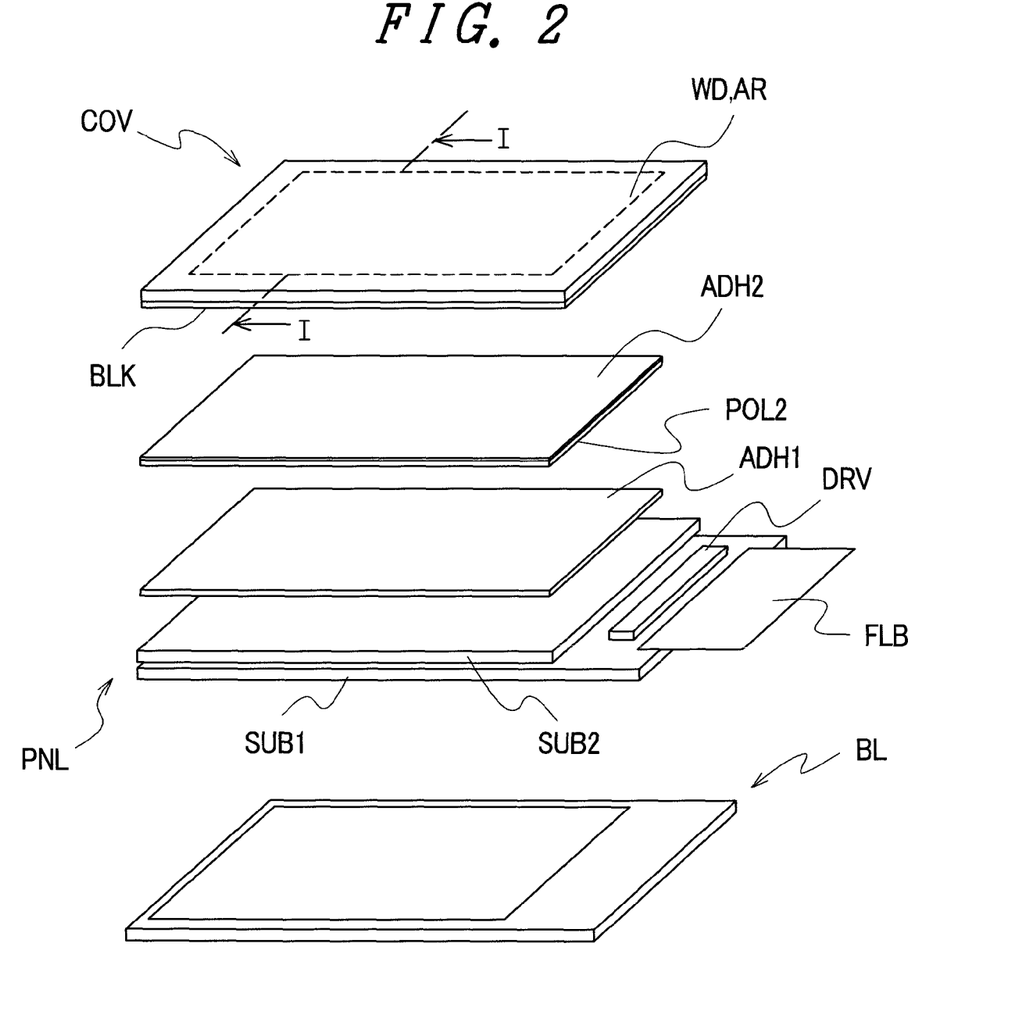
FIG. 2 is an exploded perspective view showing one embodiment of the liquid crystal display device according to the invention.

FIG. 2, being an exploded perspective view showing one embodiment of the liquid crystal display device according to the invention, shows a liquid crystal display device for a portable telephone.

Firstly, there is a liquid crystal display panel PNL. In the liquid crystal display panel PNL, a substrate SUB1 and a substrate SUB2, disposed facing each other across a liquid crystal, being used as an envelope, it is possible to recognize an image in a display area (indicated by a reference character AR in FIG. 3) of a substrate SUB2 side surface. One side of the substrate SUB1 being formed extended outwardly of the substrate SUB2, a drive circuit DRV for independently driving each pixel in the display area is mounted on this extended portion. Also, an external signal is input into the drive circuit DRV via a flexible substrate FLB attached to the substrate SUB1.

Also, although not shown in the figure, a polarizing plate (indicated by a reference character POL1 in FIG. 1) is affixed to a surface of the substrate SUB1 opposite to the liquid crystal. The polarizing plate POL1 is provided in order to visualize a behavior of the liquid crystal.

Also, although a polarizing plate POL2 is also disposed on a surface of the substrate SUB2 opposite to the liquid crystal, the polarizing plate POL2, not being one directly attached to the substrate SUB2, is configured affixed to a side of a transparent cover COV, to be described hereafter.

A more specific configuration of the liquid crystal display panel PNL will be described hereafter using FIG. 3.

The transparent cover COV formed of, for example, a glass substrate (a glass plate) or a resin plate, which functions as, for example, a protective cover, is disposed on a surface of the liquid crystal display panel PNL on an observer side.

In the transparent cover COV, a light blocking film BLK being formed in an area not including a portion of the liquid crystal display panel PNL facing the display area AR, it is possible to recognize the display area AR of the liquid crystal display panel PNL through a window WD surrounded by the light blocking film BLK. The light blocking film BLK is formed on, for example, a bottom surface (a surface opposite to the observer side) of the transparent cover COV by, for example, a printing or the like.

The polarizing plate POL2 is affixed to a surface of the transparent cover COV on a liquid crystal display panel PNL side. The polarizing plate POL2, having an adhesive (a bonding member) ADH2 formed in a sheet form, in advance, on one side thereof, can be affixed to the transparent cover COV by pressing the adhesive ADH2 against the transparent cover COV. The adhesive ADH2, having a thickness of 10 to 25 μm, is of the same kind as one used in a regular adhesive polarizing plate. However, to date, the polarizing plate POL2 has been affixed to the substrate SUB2 by means of the adhesive ADH2, while the embodiment has a feature in that it is affixed to the transparent cover COV side.

Also, in the transparent cover COV to which is affixed the polarizing plate POL2, the surface to which is affixed the polarizing plate POL2 is affixed to a surface of the observer side substrate SUB2 of the liquid crystal display panel PNL using, for example, a sheet form adhesive (a bonding member) ADH1. That is, in the embodiment, a position of the adhesive ADH1 and a position of the adhesive ADH2 are inverted in comparison with heretofore known ones.

The adhesive ADH1, being formed larger in thickness than, for example, the adhesive ADH2 formed on the polarizing plate POL2, has a function of filling a chemical polishing flaw, called a dimple, formed in the substrate SUB2 of the liquid crystal display panel PNL, too, as will be apparent hereafter.

Furthermore, a backlight BL is disposed on a side of the liquid crystal display panel PNL opposite to the transparent cover COV. The backlight BL is configured including a surface light source facing the display area AR of the liquid crystal display panel PNL.

In the heretofore described embodiment, the transparent cover COV has been shown as one used as a protective cover but, this not being limiting, it is also acceptable that it is, for example, a substrate configuring a touch panel. That is, it is also acceptable that the transparent cover COV is one having a function of a touch panel.

Also, in the heretofore described embodiment, the adhesive ADH1 used is one formed in a sheet form, but it is also acceptable that it is, for example, an adhesive made of a liquid material. In this case, it is sufficient that, for example, the adhesive made of the liquid material is applied to a surface of the substrate SUB2 of the liquid crystal display panel PNL (or a surface of the polarizing plate POL2 affixed to the transparent cover COV), and the transparent cover COV to which the polarizing plate POL2 is affixed in advance is bonded to it. In this case, by applying the adhesive ADH1 to the surface of the substrate SUB2 of the liquid crystal display panel PNL in an amount such that the adhesive ADH1, when hardened, has a thickness of 30 to 200 μm (desirably 30 μm to 100 μm), the adhesive ADH1 can reliably fill the chemical polishing flaw formed in the substrate SUB2.

Liquid Crystal Display Panel PNL

Figure 3:
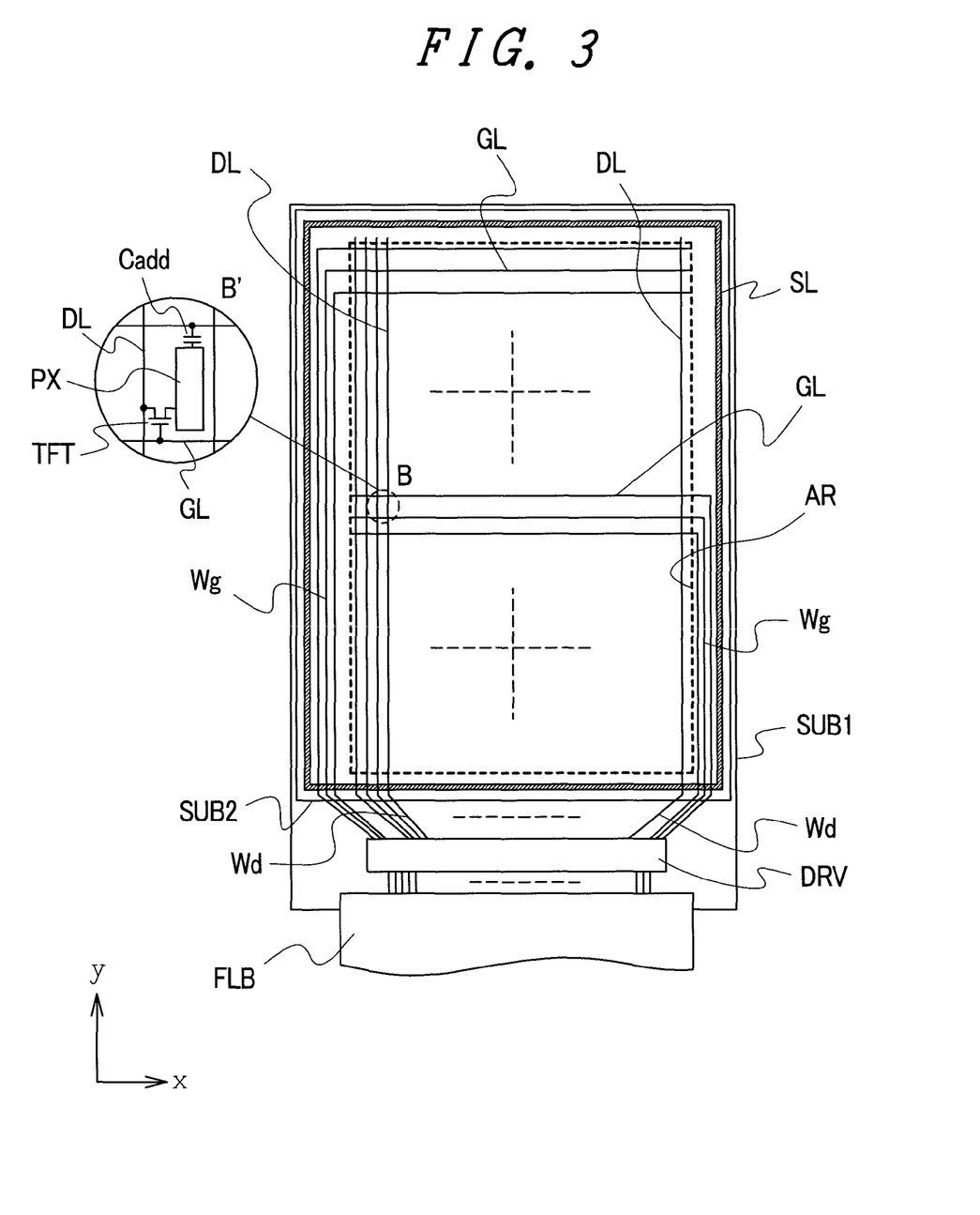
FIG. 3 is a plan view showing one embodiment of a liquid crystal display panel used in the liquid crystal display device according to the invention.

FIG. 3 is a schematic plan view showing one embodiment of the liquid crystal display panel PNL shown in FIG. 2.

In FIG. 3, there being the substrate SUB1, the substrate SUB2 is disposed, on a front side (the observer side), facing the substrate SUB1.

The substrate SUB2, being formed smaller in area than the substrate SUB1, has an area in which the substrate SUB1 is exposed, for example, on a bottom side in the figure. A drive circuit DRV, to be described hereafter, formed of a semiconductor device, which independently drives each pixel is mounted on the substrate SUB1 in this area.

The substrate SUB2 is fixed to the substrate SUB1 by a seal material SL which, being formed in a circular pattern, is disposed on a perimeter of the substrate SUB2, and the seal material SL seals in the liquid crystal sandwiched between the substrate SUB1 and the substrate SUB2.

A sealed in area of the liquid crystal surrounded by the seal material SL configures the display area AR. The display area AR, to be exact, indicating an area (an area surrounded by the bold dashed line frame in the figure) of an outer contour surrounding a collection of pixels, is used in this sense in the following description too. For this reason, there is a case of having a slight gap between the display area AR and the seal material SL.

Gate signal lines GL, which extend in an x direction in the figure, and are provided in parallel in a y direction in the figure, and drain signal lines DL, which are insulated from the gate signal lines GL, extend in the y direction in the figure, and are provided in parallel in the x direction in the figure, are formed on a liquid crystal side surface of the substrate SUB1 in the display area AR.

An area surrounded by a pair of adjacent gate signal lines GL and a pair of adjacent drain signal lines DL (for example, an area indicated by a dashed line frame B in the figure) configures a pixel area, by which means pixel areas are disposed in a matrix form inside the display area AR.

A thin film transistor TFT, which is activated in response to a signal (a scanning signal) from a gate signal line GL, a pixel electrode PX, to which a signal (an image signal) from a drain signal line DL is supplied through the activated thin film transistor TFT, and a capacitive element Cadd formed between another gate signal line GL, adjacent to the gate signal line GL driving the thin film transistor TFT, and the pixel electrode PX, are formed in each pixel area, as shown in a diagram B' in which is enlarged the portion of the dashed line frame B in the figure, thereby configuring a pixel.

The capacitive element Cadd is provided in order to cause the image signal supplied to the pixel electrode PX to be stored for a long time in the pixel element PX.

Also, the pixel element PX causes an electric field to occur, between itself and an opposite electrode (not shown) formed in each pixel area in common, on a liquid crystal side surface of the substrate SUB2 disposed facing the substrate SUB1.

A scanning signal is supplied to each gate signal line GL from the drive circuit DRV via a wiring Wg which, being connected to a corresponding output terminal of the drive circuit DRV, is extended to one side of left and right sides of the liquid crystal display area AR. An image signal is supplied to each drain signal line DL from the drive circuit DRV via a wiring Wd from a corresponding output terminal thereof.

The scanning signal is sequentially supplied to each gate signal line GL in a way such as, for example, from an upper gate signal line to a lower one, and furthermore, returning to the upper one, and the image signal is supplied in accordance with a timing of the supply of the scanning signal.

An input signal is supplied to the drive circuit DRV via the flexible substrate FLB fixed to an edge of the TFT substrate SUB1 on the bottom side in the figure.

Although not shown in the figure, a black matrix (a light blocking film), a color filter and the opposite electrode are formed on the liquid crystal side surface of the substrate SUB2, and an alignment film is formed on a surface of the opposite electrode.

Also, although not shown in the figure, for example, spherical or columnar spacers are disposed, scattered between the substrate SUB1 and the substrate SUB2, in an area surrounded by the seal material SL. This is for making a gap between the substrate SUB1 and the substrate SUB2 uniform using the spacers.

Figure 1:
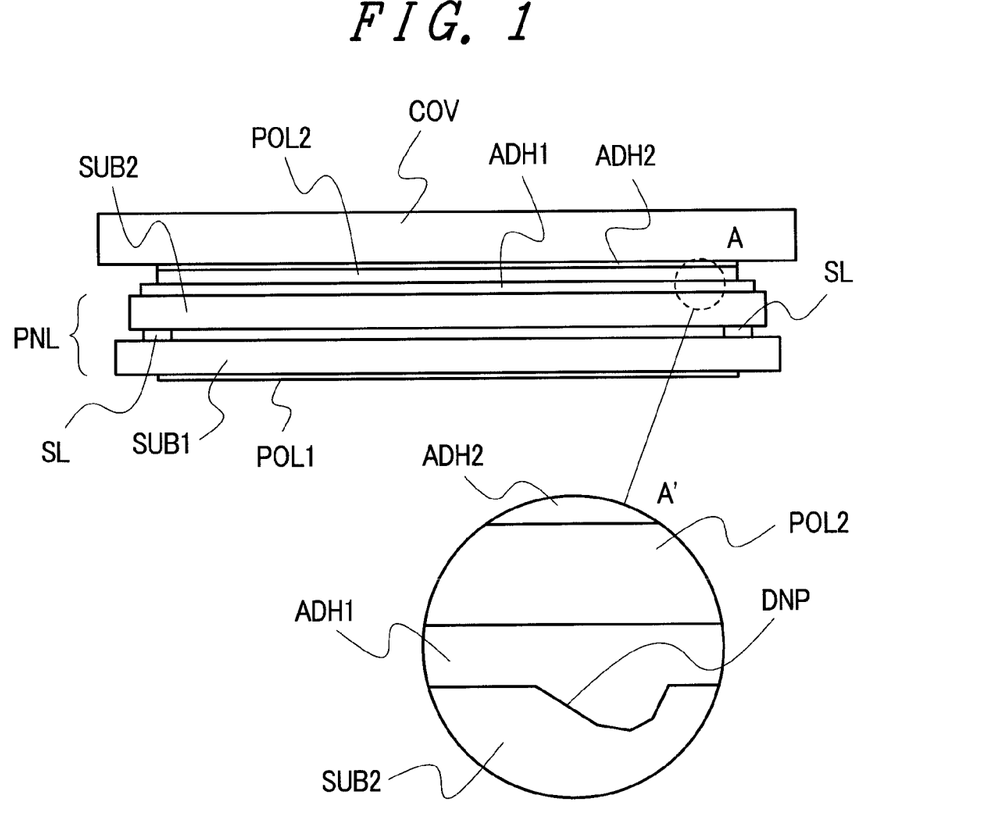
FIG. 1 is a sectional view showing one embodiment of a liquid crystal display device according to the invention, corresponding to a section taken along line I-I of FIG. 2.

FIG. 1, showing a view in a case in which the liquid crystal display panel PNL and the transparent cover COV are bonded together, shows a sectional view taken along line I-I of FIG. 2 (an illustration of the light blocking film BLK is omitted. The same applies in the following sectional views).

The transparent cover COV, for example, being formed larger than the liquid crystal display panel PNL, is bonded in such a way that an outer contour of the liquid crystal display panel PNL is positioned inside an outer contour of the transparent cover COV.

The transparent cover COV has the polarizing plate POL2 affixed to a surface thereof on the liquid crystal display panel PNL side.

In the polarizing plate POL2, for example, an area thereof is formed smaller than an area of the transparent cover COV, and an outer contour thereof is positioned inside the outer contour of the transparent cover COV.

Then, the polarizing plate POL2 is formed in such a way that a peripheral edge thereof is superimposed on the seal material SL of the liquid crystal display panel PNL. As the polarizing plate POL2 has the function of visualizing the behavior of the liquid crystal in the display area AR, this is for disposing the polarizing plate POL2, sufficiently covering at least the display area AR of the liquid crystal display panel PNL.

The polarizing plate POL2, by attaching the sheet form adhesive ADH2, which is affixed to one surface thereof in advance, to the transparent cover COV, is affixed to the transparent cover COV, as heretofore described. Herein, the adhesive ADH2, being relatively small in thickness, has a thickness of 10 to 25 μm.

Then, the transparent cover COV, to which the polarizing plate POL2 is affixed in this way, is bonded to the liquid crystal display panel PNL, for example, with the adhesive ADH1, formed in the sheet form, interposed on a surface of the transparent cover COV on a polarizing plate POL2 side.

It is preferable that the adhesive ADH1 has approximately the same refractive index as, for example, the substrate SUB2 of the liquid crystal display panel PNL (it is desirable that a refractive index difference between the two is 0.2 or less). This is for preventing an unnecessary interface reflection caused by a refractive index difference in an interface with the adhesive ADH1, avoiding a deterioration in a display contrast.

Also, the adhesive ADH1 has a thickness of 30 to 200 μm, which is larger than the thickness of the adhesive ADH2 used in affixing the polarizing plate POL2 to the transparent cover COV.

With respect to the bonding of the transparent cover COV and the liquid crystal display panel PNL, it is acceptable to either attach the adhesive ADH1 to the liquid crystal display panel PNL, and press the surface of the transparent cover COV, on which is formed the polarizing plate POL2, against the adhesive ADH1, or to attach the adhesive ADH1 to the surface of the transparent cover COV, on which is formed the polarizing plate POL2, and press the liquid crystal display panel PNL against the adhesive ADH1. Also, it is also acceptable that the adhesive ADH1 is any one of a so-called thermal curing type, a so-called light curing type, or a hybrid of the thermal curing type and the light curing type.

The surface of the liquid crystal display panel PNL which is bonded to the transparent cover COV being the surface of the substrate SUB2 on the observer side, the adhesive ADH1 is directly attached to this surface over at least a whole of the display area AR. This is for avoiding a difference occurring in a light refractive index, in the display area AR, depending on an existence or otherwise of the adhesive ADH1.

The observer side surface of the substrate SUB2 to which is attached the adhesive ADH1 is chemically polished over a whole area thereof.

This kind of polishing is performed in order to achieve a reduction in thickness of the substrate SUB1. As the polishing, it is also acceptable to adopt one which undergoes any one process of only a chemical polishing, a mechanical polishing after a chemical polishing, or a chemical polishing after a mechanical polishing.

In this case, it may happen that, due to the heretofore described chemical polishing, a chemical polishing flaw DNP called a so-called dimple is occurring on the observer side surface of the substrate SUB2. The chemical polishing flaw DNP is filled with the adhesive ADH1, avoiding an accumulation of air in the chemical polishing flaw DNP. This is because the adhesive ADH1, being 30 to 200 μm in thickness, as heretofore described, has a thickness sufficient to fill the chemical polishing flaw DNP.

A view inside the solid line circle A' in the figure is a view showing in enlarged dimension an interface portion (a portion of a dashed line circle A) between the substrate SUB2 and the polarizing plate POL2. As shown in the same view, it can be seen that a polishing flaw DNP called a dimple is formed in the surface of the substrate SUB2, and the polishing flaw DNP is sufficiently filled with the adhesive ADH1 formed between the substrate SUB2 and the polarizing plate POL2.

By this means, it is possible to avoid a bright spot defect occurring due to air accumulated in the polishing flaw DNP in the surface of the substrate SUB2.

Incidentally, in a case in which, as heretofore known, the polarizing plate POL2 is fixed to the liquid crystal display panel PNL, using the adhesive ADH2 adhering to the polarizing plate POL2, and a bonding of the polarizing plate POL2 of the liquid crystal display panel PNL and the transparent cover COV is carried out using an adhesive equivalent to the adhesive ADH1, that is, in a case in which the adhesive ADH1 and the adhesive ADH2 are positioned in inverse relation to that of the embodiment, a thickness of the adhesive ADH2 being small, a case occurs in which the polishing flaw DNP formed in the substrate SUB2 is not sufficiently filled with the adhesive ADH2, causing a problem in that it is not possible to adopt a sufficient countermeasure against the so-called bright spot defect.

As the adhesive ADH1 is also formed in order to solve the problem caused by the polishing flaw DNP formed in the display area AR of the substrate SUB2, it is necessary that it is formed in such a way as to cover the display area AR. However, it is also acceptable that the adhesive ADH1 is formed beyond the display area AR. In other words, it is also acceptable that a peripheral edge of the adhesive ADH1 is formed, for example, as far as an outer area of the seal material SL, as shown in FIG. 1.

Embodiment 2

Figure 4A:
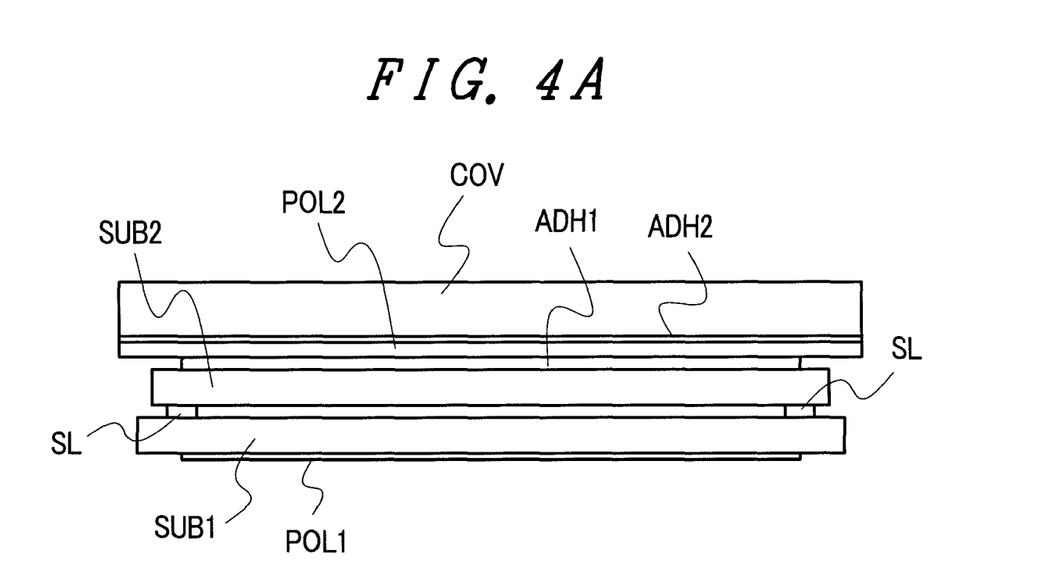
FIGS. 4A and 4B are sectional views showing another embodiment of the liquid crystal display device according to the invention, corresponding to a section taken along line I-I of FIG. 2.

FIG. 4A, being a configuration view showing another embodiment of the liquid crystal display device according to the invention, is drawn corresponding to FIG. 1. In FIG. 4A, members with reference characters identical to those of FIG. 1 are identical to the members shown in FIG. 1.

Firstly, in FIG. 4A, a configuration which is distinctive in comparison with FIG. 1 is that a transparent cover COV, being formed larger than a liquid crystal display panel PNL, is bonded in such a way that an outer contour of the liquid crystal display panel PNL is positioned inside an outer contour of the transparent cover COV.

Then, another distinctive configuration is that a polarizing plate POL2 too, being formed larger than the liquid crystal display panel PNL, is of a size such that the outer contour of the liquid crystal display panel PNL is positioned inside an outer contour of the polarizing plate POL2. The polarizing plate POL2 is fixed over a whole area, or approximately the whole area, of a surface of the transparent cover COV on a liquid crystal display panel PNL side, using an adhesive ADH2 interposed between the polarizing plate POL2 and the transparent cover COV.

In other words, the distinctive configuration lies in that, when viewed in plan, an edge of the transparent cover COV and an edge of the polarizing plate POL2 are configured in such a way as to protrude outside a substrate SUB2 of the liquid crystal display panel PLN.

By configuring in this way, it is possible to obtain a liquid crystal display device for which a countermeasure is taken against a so-called yellow border. A detailed description of the yellow border and the countermeasure against it will be given hereafter.

Figure 4B:
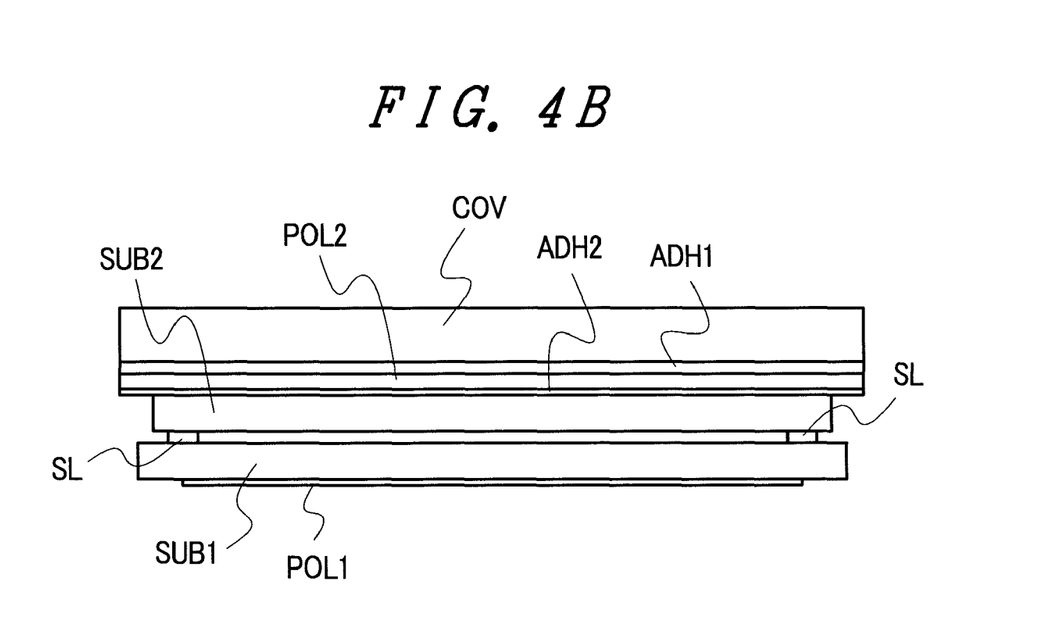

In the liquid crystal display device shown in the embodiment, in a case of attempting to take only the heretofore described countermeasure against the yellow border, it is also acceptable that, for example, as shown in FIG. 4B, the polarizing plate POL2 is fixed to the liquid crystal display panel PNL, using the adhesive ADH2 (thickness: 10 to 25 μm) adhering to the polarizing plate POL2 in advance, and a bonding of the liquid crystal display panel PNL and the transparent cover COV is carried out using the same kind of adhesive ADH1 (thickness: 30 to 200 μm) as the adhesive ADH1 shown in the embodiment 1. In this case, it is desirable that a surface of the substrate SUB2 is not chemically polished.

However, in the event that, as shown in FIG. 4A, the polarizing plate POL2 is fixed to the transparent cover COV, using the adhesive ADH2 adhering to the polarizing plate POL2, and the bonding of the liquid crystal display panel PNL and the transparent cover COV is carried out using the ADH1, an advantageous effect is achieved in that it is possible to adopt the countermeasure against the yellow border, as well as the same kind of countermeasure against the dimple as that shown in the embodiment 1.

Herein, a description will be given, using FIGS. 5A to 5C, of a reason why the yellow border occurs in a case in which, unlike the heretofore described configuration of the embodiment 2, an edge of a transparent cover COV and an edge of a polarizing plate POL2, when viewed in plan, being inside a substrate SUB2 of a liquid crystal display panel PNL, are configured not protruding outside the substrate SUB2 of the liquid crystal display panel PNL.

Figure 5A:
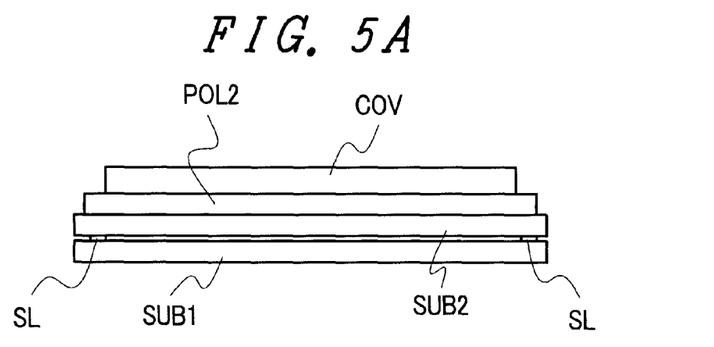
FIGS. 5A to 5C are illustrations relating to a reason why a yellow border occurs in a display area of the liquid crystal display panel.

FIG. 5A is a view showing a case in which the edge of the transparent cover COV bonded to the liquid crystal display panel PNL, and the edge of the polarizing plate POL2 interposed between the liquid crystal display panel PNL and the transparent cover COV, are inside the liquid crystal display panel PNL. In order to simplify a description, a drawing of an adhesive formed between the polarizing plate POL2 and the transparent cover COV, and an adhesive between the polarizing plate POL2 and the liquid crystal display panel PNL, is omitted.

Figure 5B:
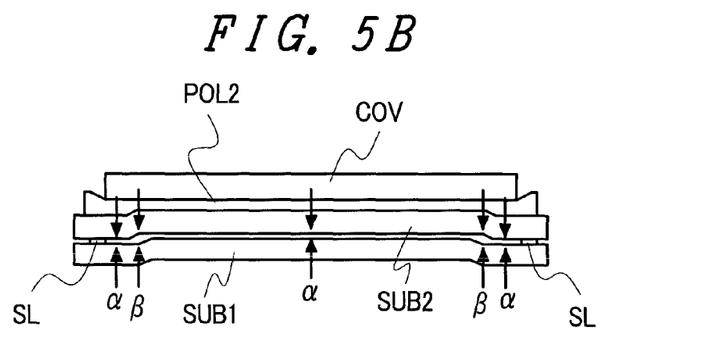

FIG. 5B shows that the polarizing plate POL2 absorbs moisture at the edge thereof, and the edge expands. This expansion reaches to an area overlapping the transparent cover COV. In this case, a deformation of the transparent cover COV due to the expansion of the edge of the polarizing plate POL2 is slight. This is because it is common that the transparent cover COV is formed thicker than a substrate SUB1, and the substrate SUB2, of the liquid crystal display panel PNL.

Meanwhile, the liquid crystal display panel PNL is deformed (curved) in such a way as to have a convexity on a transparent cover COV side. This is because, in the liquid crystal display panel PNL attached to the transparent cover COV, a perimeter thereof experiences a force in a direction opposite to the transparent cover COV side due to the expansion of the polarizing plate POL2.

The heretofore described deformation of the liquid crystal display panel PNL is also undergone in the same way, as well as in the substrate SUB2 attached to the transparent cover COV side, in the substrate SUB1 fixed by the substrate SUB2 and a seal material SL.

In this case, as spacers exist in a space in which is sealed a liquid crystal between the substrate SUB1 and the substrate SUB2, as heretofore described, it does not happen that a gap between the substrate SUB1 and the substrate SUB2 becomes smaller (a portion of a gap a in the figure) over approximately a whole of a display area AR, but a phenomenon occurs in which a distortion occurs in a portion spaced apart and slightly inward from the seal material SL, and the gap becomes larger (a portion of a gap β in the figure) in the portion. For this reason, a thickness of a liquid crystal layer changes in the portion.

Figure 5C:
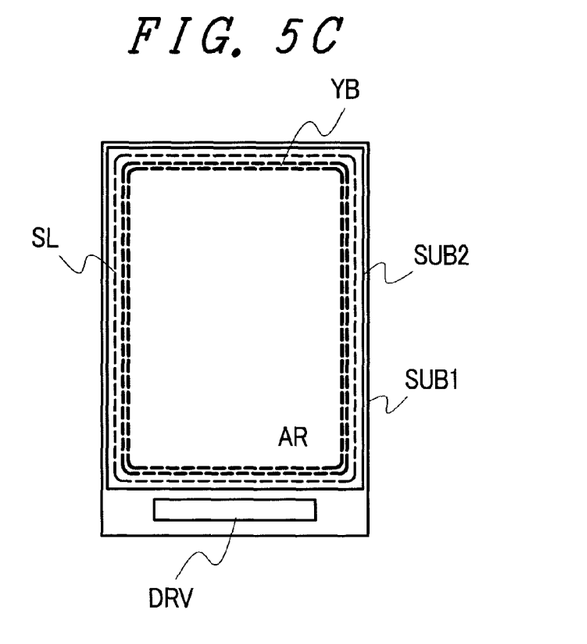

Then, in the portion, as shown in FIG. 5C which is a schematic plan view of the liquid crystal display panel PNL, a circular yellow border YB occurs in a vicinity of the seal material SL inside the display area AR of the liquid crystal display panel PNL.

Figure 6:
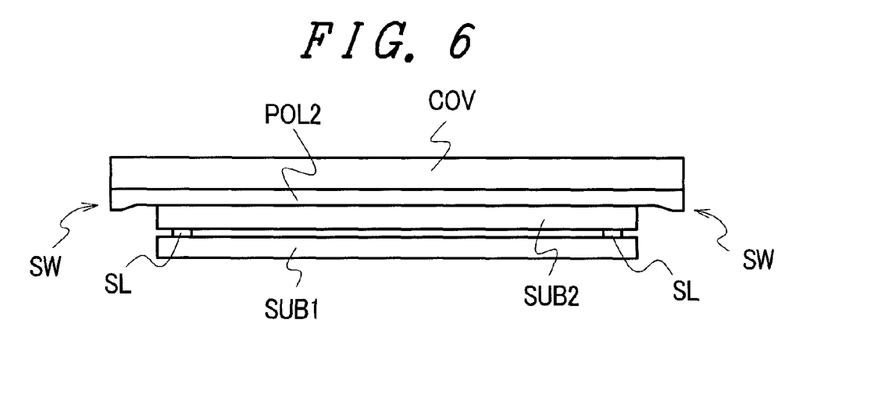
FIG. 6 is an illustration showing a reason why it is possible to avoid the yellow border in the liquid crystal display device according to the invention.

As opposed to this, FIG. 6, being a simple configuration view of the embodiment, drawn corresponding to the heretofore described FIG. 4A, shows that an expansion (indicated by an arrow SW in the figure) occurs at an edge of a polarizing plate POL2.

However, as heretofore described, an edge of a transparent cover COV and the edge of the polarizing plate POL2 being configured protruding outside a substrate SUB2 of a liquid crystal display panel PNL, a configuration is such that the heretofore described expansion of the polarizing plate POL2 does not affect the liquid crystal display panel PNL, that is, it does not exert a force on a liquid crystal display panel PNL side.

For this reason, it not happening that a deformation occurs in the liquid crystal display panel PNL due to the expansion of the polarizing plate POL2, it is therefore possible to avoid the occurrence of the yellow border.

Also, it is desirable that an area in which the polarizing plate POL2 expands does not overlap the substrate SUB2 but, even though there is some overlap, as the edge of the polarizing plate POL2 is in a position farther from a display area AR in comparison with the embodiment 1, even in the event that the liquid crystal display panel PNL is somewhat deformed, as a portion in which a gap of a liquid crystal layer changes is outside the display area AR, it is possible to avoid effects of the yellow border.

With respect to this kind of yellow border, in a case in which the transparent cover COV is configured of, for example, an acrylic resin, as the edge thereof is likely to expand in the same way as the polarizing plate POL2, in this kind of case too, it is preferable to apply the invention.

Embodiment 3

Figure 7A:
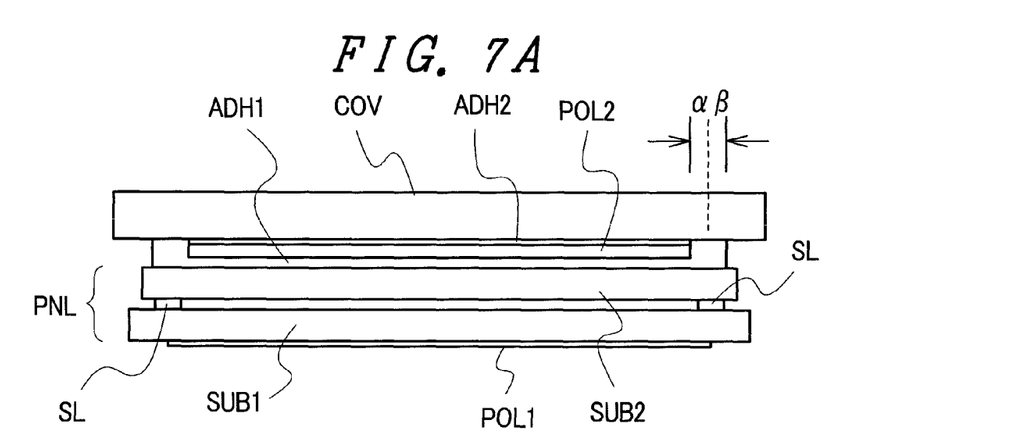
FIGS. 7A and 7B are sectional views showing still another embodiment of the liquid crystal display device according to the invention.

FIG. 7A, being a sectional view showing still another embodiment of the liquid crystal display device according to the invention, is a corresponding view of FIG. 1. In FIG. 7A, members with reference characters identical to those of FIG. 1 are identical to the members shown in FIG. 1.

In FIG. 7A, in a case of comparing with the configuration of FIG. 1, in a polarizing plate POL2 affixed to a transparent cover COV by means of an adhesive ADH2, an edge thereof, as well as the adhesive ADH2, is positioned inside an area surrounded by a seal material SL spaced, for example, a distance α (0.2 mm or less) away from a center of the seal material SL.

Also, an adhesive ADH1 which bonds together the transparent cover COV, to which is affixed the polarizing plate POL2, and a liquid crystal display panel PNL is formed in a condition in which it completely covers the polarizing plate POL2, and an edge of the adhesive ADH1 is positioned outside an area surrounded by the seal material SL, for example, spaced a distance β (0.1 mm or less) away from the center of the seal material SL.

It goes without saying that the polarizing plate POL2 covers the heretofore described display area AR of the liquid crystal display panel PNL. This is because the polarizing plate POL2 is provided in order to visualize the behavior of the liquid crystal in the display area AR.

With the liquid crystal display device of the heretofore described configuration, as all of the edge (a side surface) of the polarizing plate POL2 is covered with the adhesive ADH1, it not happening that moisture is absorbed from the edge of the polarizing plate POL2, it is possible to avoid an expansion of the edge. Consequently, it is possible to prevent the occurrence of the yellow border.

Also, by setting each of the edge of the polarizing plate POL2 and the edge of the adhesive ADH1 in a position within the heretofore described range from the center of the seal material SL, it being possible to secure a large distance from the edge of the polarizing plate POL2 to the edge of the adhesive ADH1, it is possible to reliably prevent a penetration of moisture into the edge of the polarizing plate POL2.

Figure 7B:
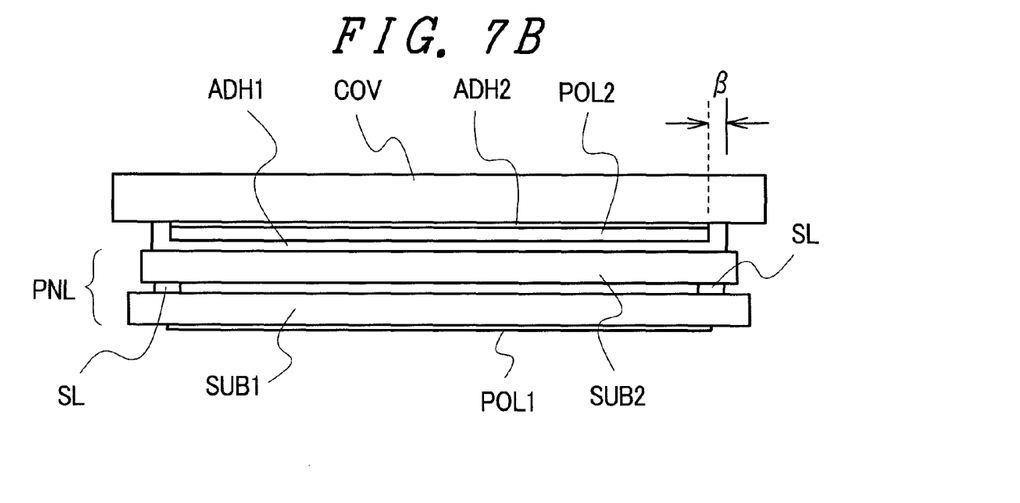

However, this not being limiting, as shown in FIG. 7B, it is also acceptable that the polarizing plate POL2, as well as the adhesive ADH2, is extended outward in such a way that the edges thereof are superimposed on the seal material SL, or aligned with the center of the seal material SL.

In the embodiment 3, a description has been given mainly of a configuration for the countermeasure against the yellow border. However, it goes without saying that, in the same way as in the embodiment 1, a configuration is adopted such that, in a case in which a substrate SUB2 of the liquid crystal display panel PNL is chemically polished, it is possible to avoid the yellow border along with an adverse effect caused by the chemical polishing flaw DNP called the dimple. This is because a configuration is adopted such that a surface of the substrate SUB2 is covered with the adhesive ADH1 which is large in thickness, in the display area AR of the surface.

In the heretofore described embodiments 1 to 3, the polarizing plate POL2 is taken as one example of an optical member adhering to the transparent cover COV. However, this not being limiting, needless to say, it is acceptable that it is another optical member such as, for example, a retardation plate. That is, it is sufficient that the optical member includes at least one of the polarizing plate or the retardation plate.

It is also acceptable to employ the heretofore described embodiments 1 to 3 individually, or in combination unless they are mutually exclusive. This is because the advantages in each embodiment can be achieved individually or synergetically.

What is claimed is:

1. A liquid crystal display device comprising:
    a liquid crystal display panel having a first substrate, a second substrate disposed on an observer side of the first substrate, and a liquid crystal layer sandwiched between the first substrate and the second substrate, and
    a transparent cover affixed by means of a first bonding member to a surface of the liquid crystal display panel on the observer side, wherein
    the transparent cover has an optical member affixed by means of a second bonding member to a surface of the transparent cover facing the second substrate, and
    when viewed in plan, an edge of the transparent cover and an edge of the optical member protrude outside the second substrate.

2. The liquid crystal display device according to claim 1, wherein
    the second substrate has a chemically polished surface on the observer side,
    the first bonding member, as well as making direct contact with both the polished surface of the second substrate and the optical member, covers all of a surface portion of the second substrate corresponding to a display area, and
    the first bonding member is 30 to 200 μm in thickness, while the second bonding member is 10 to 25 μm in thickness.

3. The liquid crystal display device according to claim 1, wherein
    the first bonding member is 30 to 200 μm in thickness.

4. The liquid crystal display device according to claim 1, wherein
    the first bonding member is 30 to 100 μm in thickness.

5. The liquid crystal display device according to claim 1, wherein
    the first bonding member is an adhesive into which a liquid is cured.

6. The liquid crystal display device according to claim 1, wherein
    the first bonding member is an adhesive.

7. The liquid crystal display device according to claim 1, wherein
    the second bonding member is an adhesive having a thickness of 10 to 25 μm.

8. The liquid crystal display device according to claim 1, wherein
    the optical member includes at least one of a polarizing plate or a retardation plate.

9. The liquid crystal display device according to claim 1, wherein
    the transparent cover is a protective cover configured of a glass plate or a resin plate.

10. The liquid crystal display device according to claim 1, wherein
    the transparent cover has a function of a touch panel.

* * * * *